United States Patent
Hwang et al.

(10) Patent No.: US 9,740,964 B2
(45) Date of Patent: Aug. 22, 2017

(54) OBJECT CLASSIFICATION THROUGH SEMANTIC MAPPING

(71) Applicant: Disney Enterprises, Inc., Burbank, CA (US)

(72) Inventors: Sung Ju Hwang, Pittsburgh, PA (US); Jonghyun Choi, Greenbelt, MD (US); Leonid Sigal, Pittsburgh, PA (US)

(73) Assignee: Disney Enterprises, Inc., Burbank, CA (US)

( * ) Notice: Subject to any disclaimer, the term of this patent is extended or adjusted under 35 U.S.C. 154(b) by 176 days.

(21) Appl. No.: 14/675,268

(22) Filed: Mar. 31, 2015

(65) Prior Publication Data

US 2016/0292538 A1 Oct. 6, 2016

(51) Int. Cl.
*G06K 9/62* (2006.01)

(52) U.S. Cl.
CPC ........... *G06K 9/6269* (2013.01); *G06K 9/628* (2013.01); *G06K 9/6286* (2013.01)

(58) Field of Classification Search
None
See application file for complete search history.

(56) References Cited

U.S. PATENT DOCUMENTS

2014/0372439 A1* 12/2014 Lu .................... G06F 17/30256
707/737

OTHER PUBLICATIONS

Ying Liu et al., "A survey of content-based image retrieval with high-level semantics", 2006, Pattern Recognition Society. Published by Elsevier Ltd, Pattern Recognition 40 (2007) 262-282.*
Sung Ju Hwang, "Discriminative Object Categorization with External Semantic Knowledge", The Dissertation for Sung Ju Hwang, 2013, 185 pages total.*
Kilian Weinberger, "Large Margin Taxonomy Embedding with an Application to Document Categorization", NIPS 2008, pp. 1-8.
Samy Bengio, "Label Embedding Trees for Large Multi-Class Tasks", NIPS 2010, pp. 1-9.
Andrea Fome, "DeViSE: A Deep Visual-Semantic Embedding Model", NIPS 2013, pp. 1-11.
Yang Zhou, "Exclusive Lasso for Multi-task Feature Selection", 2010, pp. 1-8.
Sung Ju Hwang, "Analogy-preserving Semantic Embedding for Visual Object Categorization", 2013, pp. 1-9.
Ali Farhadi, "Describing Objects by their Attributes", CVPR 2009, pp. 1-8.

(Continued)

*Primary Examiner* — Brian P Werner
(74) *Attorney, Agent, or Firm* — Farjami & Farjami LLP (57) ABSTRACT

There are provided systems and methods for performing object classification through semantic mapping. Such an object classification system includes a system processor, a system memory, and an object categorizing unit stored in the system memory. The system processor is configured to execute the object categorizing unit to receive image data corresponding to an object, and to transform the image data into a directed quantity expressed at least in part in terms of semantic parameters. The system processor is further configured to determine a projection of the directed quantity onto an object representation map including multiple object categories, and to associate the object with a category from among the multiple object categories based on the projection.

20 Claims, 5 Drawing Sheets

(56) References Cited

OTHER PUBLICATIONS

Zeynep Akata, "Label-Embedding for Attribute-Based Classification", CVPR 2013, pp. 1-9.
John Duchi, "Efficient Online and Batch Learning Using Forward Backward Splitting", 2009, pp. 2900-2934 (36).
Tianshi Gao, "Discriminative Learning of Relaxed Hierarchy for Large-scale Visual Recognition", ICCV 2011, pp. 1-8.
Gregory Griffin, "Learning and Using Taxonomies for Fast Visual Categorization", CVPR 2008, pp. 1-8.
Sung Ju Hwang, "Sharing Features Between Objects and Their Attributes", CVPR 2008, pp. 1761-1768 (8).
Jeff Donahue, "DeCAF: A Deep Convolutional Activation Feature for Generic Visual Recognition", 2014, pp. 1-9.
Christoph H. Lampert, "Learning to Detect Unseen Object Classes by Between-Class Atribute Transfer", CVPR 2009, pp. 1-8.
Marcin Marszalek, "Constructing Category Hierarchies for Visual Recognition", ECCV 2008, pp. 1-14.
Thomas Mensink, "Distance-Based Image Classification: Generalizing to new classes at near-zero cost", May 17, 2013, pp. 1-14.
Julien Mairal, "Supervised Dictionary Learning", NIPS 2008, pp. 1-8.
Jason Weston, "WSABIE: Scaling Up to Large Vocabulary Image Annotation", 2011, pp. 1-7.
Alon Zweig, "Hierarchical Regularization Cascade for Joint Learning", ICML 2013, pp. 1-9.

* cited by examiner

OBJECT CLASSIFICATION THROUGH SEMANTIC MAPPING

BACKGROUND

Object classification is a challenging problem that requires drawing boundaries between groups of objects in a seemingly continuous space. Although various object classification techniques have been introduced, a unified semantic solution inviting user interaction and capable of producing a human readable output is needed.

SUMMARY

There are provided systems and methods for object classification through semantic mapping, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As noted above, object classification is a challenging problem that requires drawing boundaries between groups of objects in a seemingly continuous space. Although various object classification techniques have been introduced, a unified semantic solution inviting user interaction and capable of producing a human readable output is needed. The present application discloses an object classification system and a method for use by such a system to perform object classification through semantic mapping. As used herein, the term "semantic" refers to the meaning of words used to describe or otherwise characterize an object. Accordingly, "semantic mapping" refers to locating object categories within an object representation space based at least in part on the words used to describe the objects included in the categories.

Figure 1:
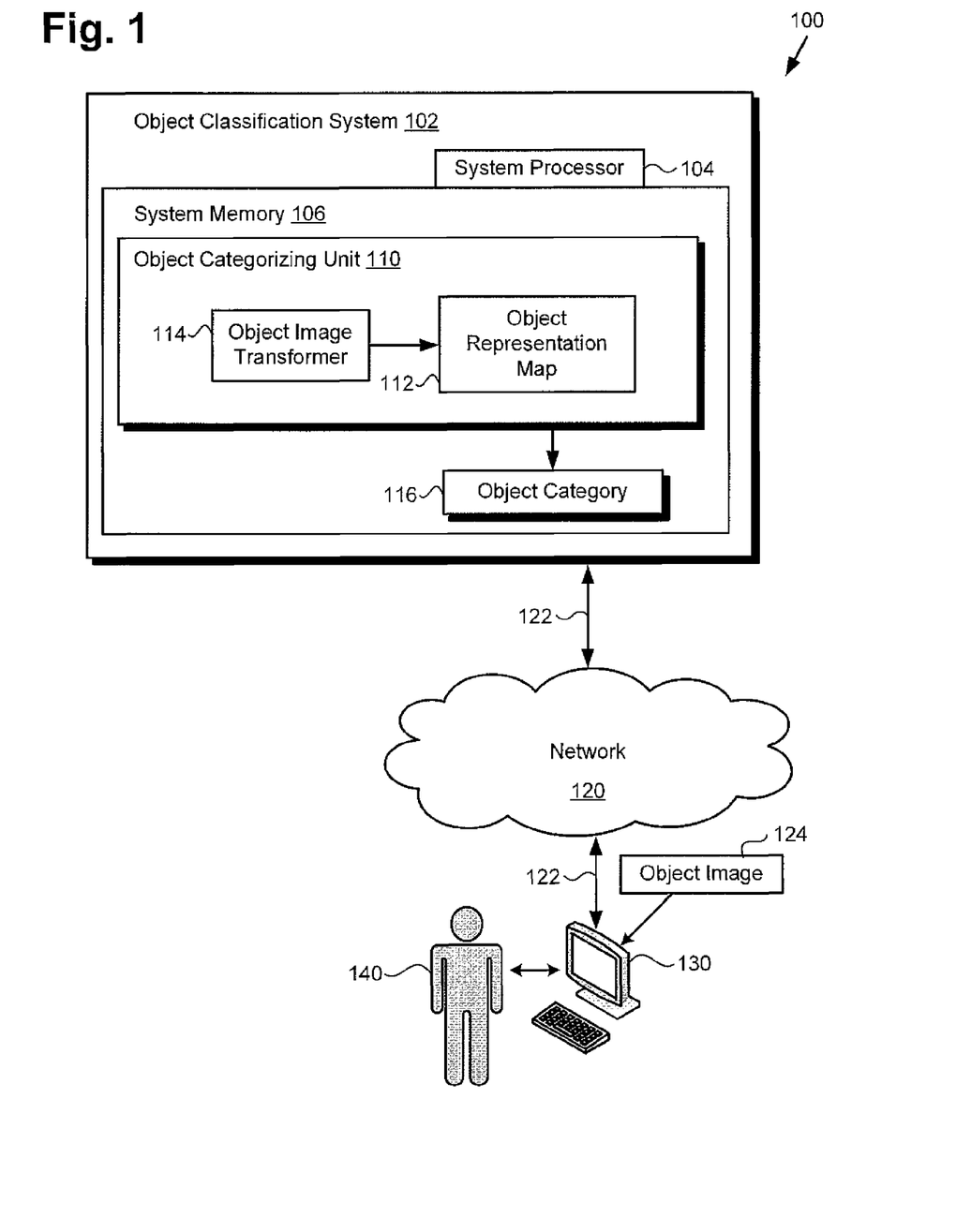
FIG. 1 shows a diagram of an exemplary object classification system, according to one implementation.

FIG. 1 shows a diagram of an exemplary object classification system, according to one implementation. As shown in FIG. 1, object classification system 102 is situated within object classification environment 100 including communication network 120, client system 130, and user 140. Object classification system 102 includes system processor 104, implemented as a hardware processor, and system memory 106 storing object categorizing unit 110 including object representation map 112 and object image transformer 114. Also shown in FIG. 1 are network communication links 122 interactively connecting client system 130 and object classification system 102 via communication network 120, object image 124, and object category 116 associated with object image 124 by object categorizing unit 110.

According to the implementation shown in FIG. 1, user 140 may utilize client system 130 to interact with object classification system 102 over communication network 120, for example to access object categorizing unit 110 remotely or to download object categorizing unit 110 to client system 130. In one such implementation, object classification system 102 may correspond to one or more web servers, accessible over a packet network such as the Internet, for example. Alternatively, object classification system 102 may correspond to one or more servers supporting a local area network (LAN), or included in another type of limited distribution network.

System processor 104 is configured to execute object categorizing unit 110 to receive image data corresponding to an object to be classified, such as object image 124, for example. System processor 104 is further configured to execute object categorizing unit 110 to use object image transformer 114 to transform the image data into a directed quantity expressed at least in part in terms of semantic parameters. System processor 104 is also configured to execute object categorizing unit 110 to determine a projection of the directed quantity onto object representation map 112, which includes multiple object categories including object category 116. In addition, system processor 104 is configured to execute object categorizing unit 110 to use object representation map 112 to associate the object corresponding to object image 124 with object category 116 from among the multiple object categories based on the projection.

It is noted that object representation map 112 may take the form of an object representation space expressed in terms of components describing the object categories included in that object representation space. For example, object representation map 112 may be expressed in terms of one or more of the following components: object class semantic similarity, object class ontology, and object attributable properties. It is further noted that the directed quantity into which the image data corresponding to object image 124 is transformed may also be expressed in terms of one or more of the described components to facilitate determination of the projection of the directed quantity onto object representation map 112.

In some implementations, system processor 104 is configured to execute object categorizing unit 110 to use object representation map 112 to associate the object corresponding to object image 124 with object category 116 based on the proximity of the projection to object category 116 on the object representation map. In some implementations, system processor 104 is configured to execute object categorizing unit 110 to use object representation map 112 to associate the object corresponding to object image 124 with object category 116 based on a semantic supercategory to which object category 116 belongs and at least one semantic attribute of the object. For example, an object classified as included in the category "zebra", may be associated with the category zebra based on the supercategory of the object, i.e., the supercategory "equine" including zebras and any other equus, and the attribute "striped" that distinguishes zebras from other equines.

Furthermore, in some implementations, system processor 104 may be configured to execute object categorizing unit 110 to provide object category 116 as a human readable output, such as an output in the form of one or more words readable by user 140, for example. In addition, in some implementations, system processor 104 may be configured to execute object categorizing unit 110 to generate object representation map 112 used to classify the object corresponding to object image 124. Moreover, in some implementations, system processor 104 may be configured to execute object categorizing unit 110 to receive an input from user 140 characterizing or rating the accuracy of object category 116, and to adaptively revise object representation map 112 interactively with user 140.

It is noted that although FIG. 1 depicts object category 116 as residing in system memory 106, in some implementations, object category 116, when provided as an output, may be copied to non-volatile storage (not shown in FIG. 1), or may be transmitted to client system 130 via communication network 120. It is further noted that although client system 130 is shown as a personal computer (PC) in FIG. 1, that representation is provided merely as an example. In other implementations, client system 130 may be another type of personal communication device, such as a smartphone, gaming console, digital media player, or tablet computer, among others.

Figure 2:
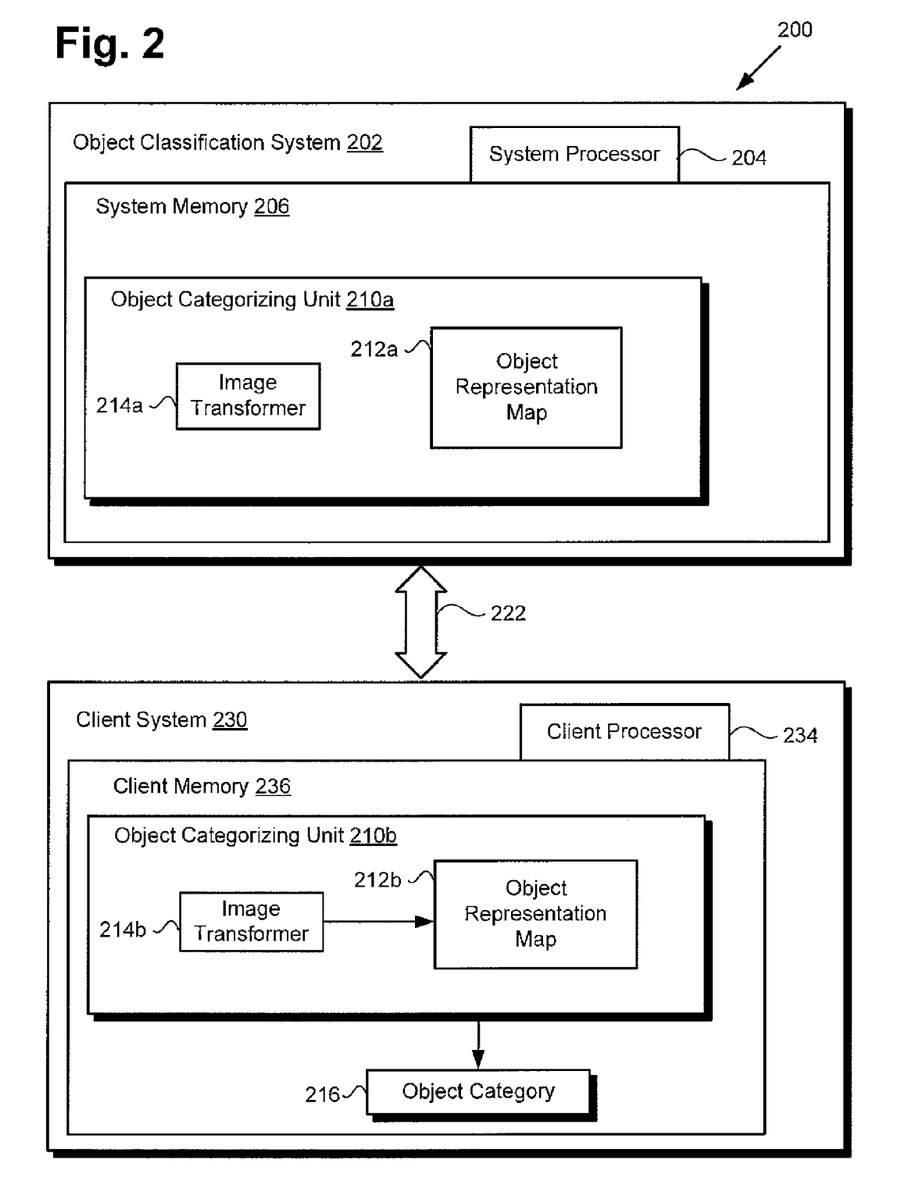
FIG. 2 shows another exemplary implementation of an object classification system.

Referring to FIG. 2, FIG. 2 shows a more detailed exemplary implementation of client system 230, which may be configured as an object classification system capable of performing object classification through semantic mapping. Object classification environment 200 in FIG. 2 includes client system 230 interactively connected to object classification system 202 over network communication link 222. As shown in FIG. 2, object classification system 202 includes system processor 204, and system memory 206 storing object categorizing unit 210a including object representation map 212a and object image transformer 214a. As further shown in FIG. 2, client system 230 includes client processor 234, and client memory 236 storing object categorizing unit 210b including object representation map 212b and object image transformer 214b. Also shown in FIG. 2 is object category 216 provided as an output by object categorizing unit 210b.

Network communication link 222, and object classification system 202 including system processor 204 and system memory 206 correspond in general to network communication link 122, and object classification system 102 including system processor 104 and system memory 106, in FIG. 1. In addition, object categorizing unit 210a including object representation map 212a and object image transformer 214a, in FIG. 2, corresponds to object categorizing unit 110 including object representation map 112 and object image transformer 114, in FIG. 1. In other words, object categorizing unit 210a, object representation map 212a, and object image transformer 214a may share any of the characteristics attributed to corresponding object categorizing unit 110, object representation map 112, and object image transformer 114 shown in FIG. 1 and described above.

Client system 230 corresponds in general to client system 130, in FIG. 1. Moreover, object categorizing unit 210b including object representation map 212b and object image transformer 214b corresponds to object categorizing unit 110/210a including object representation map 112/212a and object image transformer 114/214a. As a result, object categorizing unit 210b, object representation map 212b, and object image transformer 214b may share any of the characteristics attributed to corresponding object categorizing unit 110, object representation map 112, and object image transformer 114 shown in FIG. 1 and described above.

According to the exemplary implementation shown in FIG. 2, object categorizing unit 210b including object representation map 212b and object image transformer 214b is located in client memory 236, having been received from object classification system 202 via network communication link 222. In one implementation, network communication link 222 corresponds to transfer of object categorizing unit 210b including object representation map 212b and object image transformer 214b over a packet network, for example. Once transferred, for instance by being downloaded over network communication link 222, object categorizing unit 210b including object representation map 212b and object image transformer 214b may be persistently stored in client memory 236 and may be executed locally on client system 230 by client processor 234.

Client processor 234 may be the central processing unit (CPU) for client system 230, for example, in which role client processor 234 runs the operating system for client system 230 and executes object categorizing unit 210b. In the exemplary implementation shown in FIG. 2, a user, such as user 140, in FIG. 1, can utilize object categorizing unit 210b on client system 230 to provide object category 216, which corresponds in general to object category 116, as an output.

Figure 3:
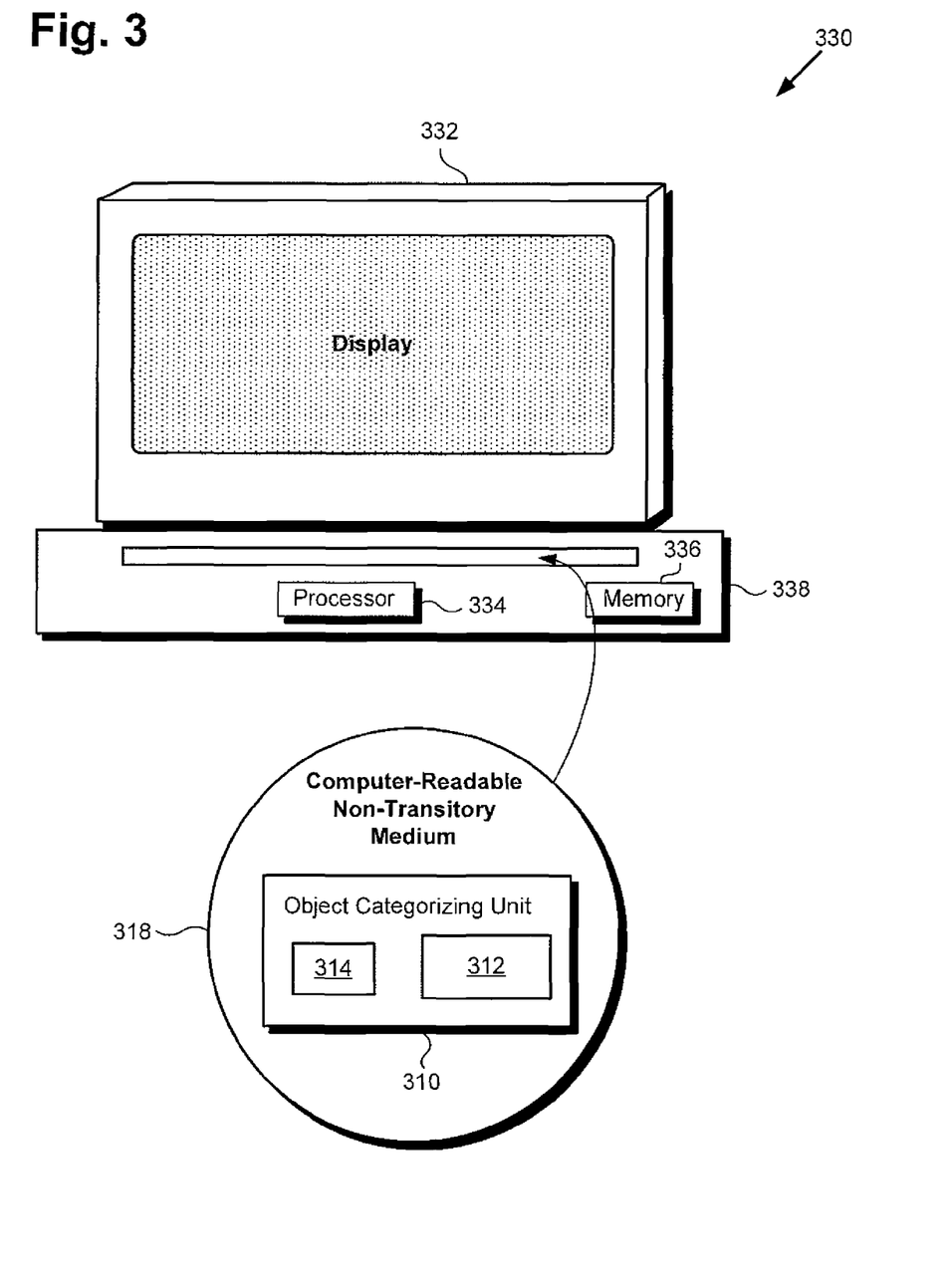
FIG. 3 shows an exemplary system and a computer-readable non-transitory medium including instructions for performing object classification through semantic mapping.

Moving now to FIG. 3, FIG. 3 shows an exemplary system and a computer-readable non-transitory medium including instructions enabling object classification through semantic mapping, according to one implementation. System 330, in FIG. 3, includes computing unit 338 including processor 334 and memory 336, interactively linked to display 332. Display 332 may take the form of a liquid crystal display ("LCD"), a light-emitting diode ("LED") display, an organic light-emitting diode ("OLED") display, or another suitable display screen that performs a physical transformation of signals to light. System 330 including processor 334 and memory 336 corresponds in general to any or all of object classification system 102 and client system 130, in FIG. 1, and object classification system 202 and client system 230, in FIG. 2.

Also shown in FIG. 3 is computer-readable non-transitory medium 318 having object categorizing unit 310 including object representation map 312 and object image transformer 314 stored thereon. The expression "computer-readable non-transitory medium," as used in the present application, refers to any medium, excluding a carrier wave or other transitory signal, that provides instructions to processor 334 of computing unit 338. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

According to the implementation shown in FIG. 3, computer-readable non-transitory medium 318 provides object categorizing unit 310 including object representation map 312 and object image transformer 314 for execution by processor 334 of computing unit 338. Object categorizing unit 310, when executed by processor 334, instantiates an object categorizing unit corresponding to object categorizing unit 110/210a/210b, in FIG. 1/2, and capable of performing all of the operations attributed to those corresponding features by the present disclosure.

Figure 4:
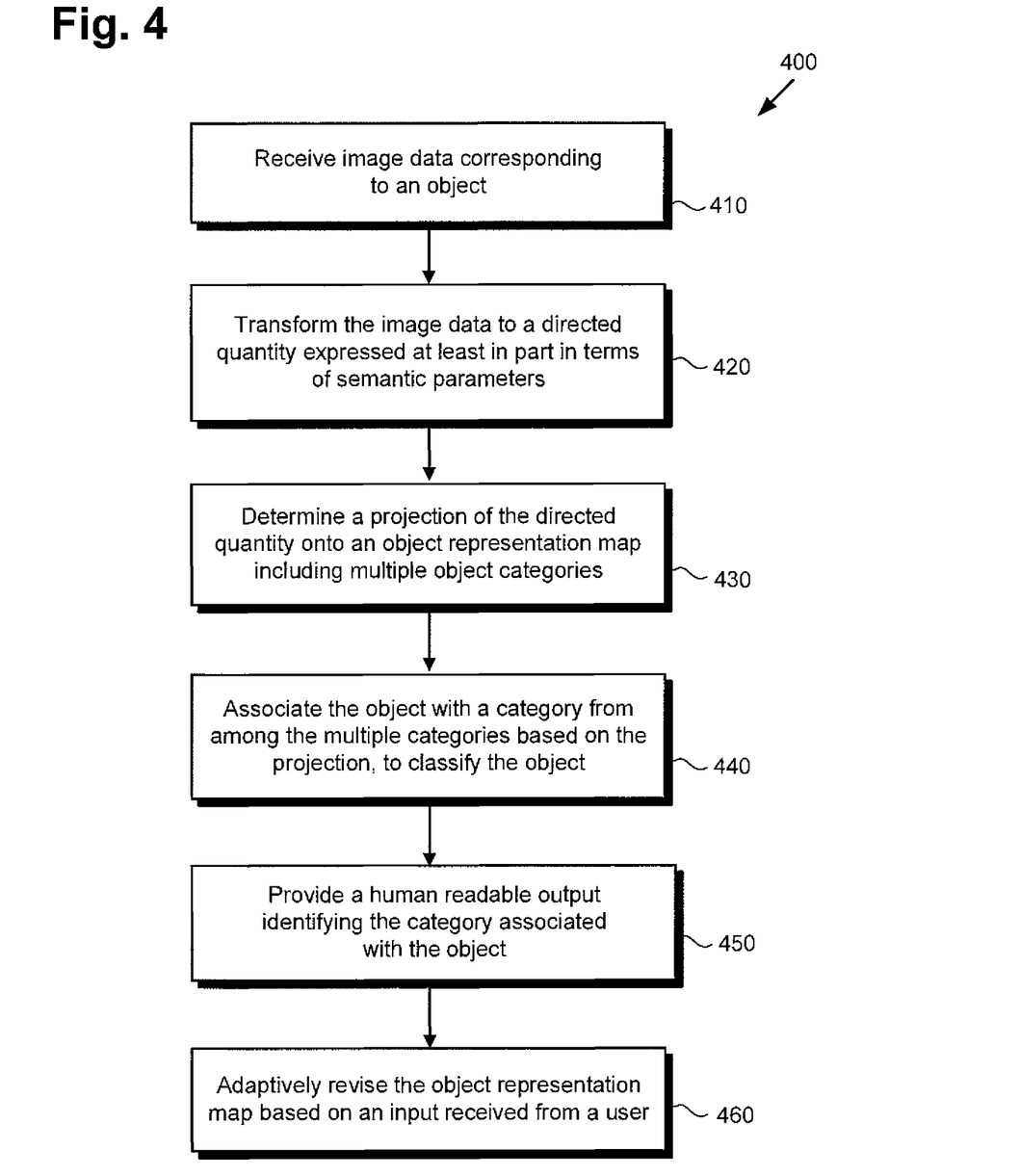
FIG. 4 is a flowchart presenting an exemplary method for use by a system to perform object classification through semantic mapping.

Referring to FIG. 4, FIG. 4 shows flowchart 400 presenting an exemplary method for use by a system to perform object classification through semantic mapping. With respect to the method outlined in FIG. 4, it is noted that certain details and features have been left out of flowchart 400 in order not to obscure the discussion of the inventive features in the present application. It is noted that the actions outlined in Flowchart 400 may each be performed by object categorizing unit 110/210a/210b/310 executed by respective processor 104/204/234/334.

Flowchart 400 begins with receiving image data corresponding to an object (action 410). As noted above with reference to FIG. 1, image data corresponding to object image 124 may be input to client system 130 by user 140, and may be received by object categorizing unit 110 of object classification system 102 over communication network 120. Object image 124 may include image data in the form of a graphical image, animation, video, for example, or any other type of content representing a visual image of the object to be classified.

Flowchart 400 continues with transforming the image data corresponding to object image 124 into a directed quantity expressed at least in part in terms of semantic parameters (action 420), determining a projection of the directed quantity onto object representation map 112 including multiple object categories including object category 116 (action 430), and associating the object corresponding to object image 124 with object category 116 based on the projection (action 440). It is reiterated that object representation map 112 may take the form of an object representation space expressed in terms of components describing the object categories included in that object representation space. As noted above, object representation map 112 may be expressed in terms of one or more of the following exemplary components: object class semantic similarity, object class ontology, and object attributable properties. A specific example of actions 420, 430, and 440 is provided below. It is noted that these exemplary details are provided with such specificity in the interests of conceptual clarity and are not to be construed as limitations.

The present solution for performing object classification through semantic mapping utilizes a unified semantic embedding model, which learns a discriminative common low-dimensional space, i.e., object representation map 112, to embed both the images and semantic concepts including object categories, while enforcing relationships between them using semantic reconstruction.

For example, let us assume a d-dimensional object image descriptor and an m-dimensional vector describing labels associated with the instances, including category labels, at different semantic granularities and attributes. The goal then is to embed the object images and the labels onto a single unified semantic space, i.e., semantic mapping, where the images are associated with their corresponding semantic labels.

To formally state the problem, given a training set $\mathcal{D}$ that has N labeled examples, i.e., $\mathcal{D}=\{x_i, y_i\}_{i=1}^N$, where $x_i \in \mathbb{R}^d$ denotes object image descriptors and $y_i \in \{1, \ldots m\}$ are their labels associated with m unique concepts, we want to embed each $x_i$ as $z_i$, and each $y_i$ as $u_{yi}$ in the $d_e$-dimensional space, such that the similarity between $z_i$ and $u_{yi}$, $S(z_i, u_{yi})$ is substantially maximized.

One way to solve this problem is to use regression, using $S(z_i, u_{yi}) = -\|z_i - u_{yi}\|_2^2$. That is, we estimate the data embedding $z_i$ as $z_i = Wx_i$, and minimize their distances to the correct label embeddings $u_{yi} \in \mathbb{R}^m$ where the dimension for $y_i$ is set to 1 (one) and every other dimension is set to 0 (zero):

$$\min_W \sum_{c=1}^m \sum_{i=1}^N \|Wx_i - u_{yi}\|_2^2 + \lambda \|W\|_F^2. \qquad (1)$$

The above ridge regression will project each instance close to its correct embedding. However, it does not guarantee that the resulting embeddings are well separated. Therefore, it may be desirable to add discriminative constraints which ensure that the projected instances have higher similarity to their own category embedding than to others. One way to enforce this condition is to use large-margin constraints on distance: $\|Wx_i - u_{yi}\|_2^2 + 1 \leq \|Wx_i - u_c\|_2^2 + \xi_{ic}$, $y_i \neq c$ which can be translated into the following discriminative loss:

$$\mathcal{L}_C(W, U, x_i, y_i) = \sum_c [1 + \|Wx_i - u_{yi}\|_2^2 - \|Wx_i - u_c\|_2^2]_+, \qquad (2)$$

$$\forall c \neq y_i,$$

where U is the column wise concatenation of each label embedding vector, such that $u_j$ denotes the $j^{th}$ column of U. After replacing the generative loss in the ridge regression formula with the discriminative loss, we get the following discriminative learning problem:

$$\min_{W,U} \sum_i^N \mathcal{L}_C(W, U, x_i, y_i) + \lambda \|W\|_F^2 + \lambda \|U\|_F^2, \qquad (3)$$

$$y_i \in \{1, \ldots, m\},$$

where $\lambda$ regularizes W and U from shooting to infinity.

Now we describe how we embed supercategories and attributes onto the learned shared space of the object representation map.

Supercategories: Although our objective is to better categorize entry level categories, categories in general can appear at different semantic granularities. Returning to the example of an object categorized as a zebra and discussed above, the zebra can be both an equus, and an odd-toed ungulate. To learn the embeddings for the supercategories, we map each data instance to be closer to its correct supercategory embedding than to its siblings:

$$\|Wx_i - u_s\|_2^2 + 1 \leq \|Wx_i - u_c\|_2^2 + \xi_{sc}, \forall s \in \mathcal{P}_{yi} \text{ and } c \in S_s$$

where $\mathcal{P}_{yi}$ denotes the set of supercategories at all levels for category s, and $S_s$ is the set of its siblings. The constraints can be translated into the following loss term:

$$\mathcal{L}_S(W, U, x_i, y_i) = \sum_{s \in \mathcal{P}_{yi}} \sum_{c \in S_s} [1 + \|Wx_i - u_s\|_2^2 - \|Wx_i - u_c\|_2^2]_+. \qquad (4)$$

Attributes: Attributes can be considered normalized basis vectors for the semantic space, i.e., the object representation map, whose combination represents a category. Basically, we want to maximize the correlation between the projected instance that possess the attribute, and its correct attribute embedding, as follows:

$$\mathcal{L}_A(W, U, x_i, y_i) = \left[1 - \sum_a (Wx_i)^T y_i^a u_a\right]_+, \quad (5)$$

$$\|u_a\|^2 \leq 1, y_i^a \in \{0, 1\},$$

$$\forall a \in \mathcal{A}_{y_i},$$

where $\mathcal{A}_c$ is the set of all attributes for class c and $u_a$ is an embedding vector for an attribute a.

Relationship between the categories, supercategories, and attributes: Simply summing up all previously defined loss functions while adding $\{u_s\}$ and $\{u_a\}$ as additional columns of U will result in a multi-task formulation that implicitly associates the semantic entities through the shared data embedding W. However, it may be desirable to further utilize the relationships between the semantic entities to explicitly impose structural regularization on the semantic embeddings U. One simple and intuitive relation is that an object class or category can be represented as the combination of its parent level category, i.e., supercategory, plus a sparse combination of attributes, which translates into the following constraint:

$$u_c = u_p + U^A \beta_c, c \in C_p, \|\beta_c\|_0 \leq \gamma_1, \beta_c \geq 0, \forall c 68 \{1, \ldots, C\}, \quad (6)$$

where $U^A$ is the aggregation of all attribute embeddings, $\{u_a\}$, $C_p$ is the set of children classes for class p, $\gamma_1$ is the sparsity parameter, and C is the number of categories. We require β to be nonnegative, since it makes more sense and is more efficient to describe an object with attributes that it might have, rather than describing it by attributes that it might not have.

We rewrite Equation 6 into a regularization term as follows, replacing the $l_0$-norm constraints with $l_1$-norm regularizations for tractable optimization:

$$\mathcal{R}(U, B) = \sum_c^C \|u_c - u_p - U^A \beta_c\|_2^2 + \gamma_2 \|\beta_c + \beta_o\|_2^2, \quad (7)$$

$$c \in C_p, o \in \mathcal{P}_c \cup \mathcal{S}_c, 0 \leq \beta_c \leq \gamma_1,$$

$$\forall c \in \{1, \ldots, C\},$$

where B is the matrix whose $j_{th}$ column vector $\beta_j$ is the reconstruction weight for class j, $S_c$ is the set of all sibling classes for class c, and γ2 is the parameter to enforce exclusivity.

The exclusive regularization term is used to prevent the semantic reconstruction $\beta_c$ for class c from fitting to the same attributes fitted by its parents and siblings. This is because attributes common across parent and child, and between siblings, are less discriminative. This regularization is especially useful for discrimination between siblings, which belong to the same supercategory and only differ by the category-specific modifier or attribute. By generating unique semantic decomposition for each class, we can better discriminate between any two categories using a semantic combination of discriminatively learned auxiliary entities.

With the sparsity regularization enforced by $\gamma_1$, the simple sum of the two weights will prevent the two (super)categories from having high weight for a single attribute, which will let each category embedding to fit to an exclusive attribute set.

After augmenting the categorization objective in Equation 3 with the supercategory and attributes loss and the sparse-coding based regularization in Equation 7, we obtain the following multitask learning formulation that jointly learns all the semantic entities along with the sparse-coding based regularization:

$$\min_{W,U,B} \sum_{i=1}^N \mathcal{L}_C(W, U, x_i, y_i) + \quad (8)$$

$$\mu_1(\mathcal{L}_S(W, U, x_i, y_i) + \mathcal{L}_A(W, U, x_i, y_i)) + \mu_2 \mathcal{R}(U, B);$$

$$\|w_j\|_2^2 \leq \lambda, \|u_k\|_2^2 \leq \lambda, 0 \leq \beta_c \leq \gamma_1 \forall j \in \{1, \ldots, d\},$$

$$\forall k \in \{1, \ldots, m\}, \forall c \in \{1, \ldots, C+S\},$$

where S is the number of supercategories, $w_j$ is W's $j_{th}$ column, and $\mu_1$ and $\mu_2$ are parameters to balance between the main and auxiliary tasks, and discriminative and generative objective.

Equation 8 can also be used for knowledge transfer when learning a model for a new set of categories, as will be further discussed below, by replacing $U^A$ in $\mathcal{R}$ (U, B) with $U^S$, learned on class set S from which the knowledge is transferred.

Equation 8 is not jointly convex in all variables, and has both discriminative and generative terms. This problem can be optimized using an alternating optimization, while each sub-problem differs. We first describe how we optimize for each variable.

Learning W and U: The optimization of both embedding models are similar, except for the reconstructive regularization on U, and the main obstacle lies in the minimization of the $\mathcal{O}$(Nm) large-margin losses. Since the losses are non-differentiable, we solve the problems using a stochastic subgradient method, by implementing a proximal gradient algorithm for handling the l-2 norm constraints with proximal operators.

Learning B: This is similar to the sparse coding problem, but simpler. A projected gradient method can be used, where at each iteration t, we project the solution of the objective $\beta_c^{t+1/2}$ for category c to l-1 norm ball and nonnegative orthant, to obtain $\beta_c^t$ that satisfies the constraints.

Alternating optimization: We decompose Equation 8 to two convex problems: 1) optimization of the data embedding W and approximation parameter B (since the two variables do not have a direct link between them), and 2) optimization of the category embedding U. We alternate the process of optimizing each of the convex problems while fixing the remaining variables, until the convergence criterion $\|W^{t+1}-W^t\|_2 + \|U^{t+1}-U^t\|_2 + \|B^{t+1}-B^t\|_2 < \epsilon$ is met, or until the maximum number of iterations is reached.

Run-time complexity: 1) Training: Optimization of W and U using a proximal stochastic gradient, has time complexities of $O(d^e\ d(k+1))$ and $O(d^e\ (dk+C))$ respectively. Both terms are dominated by the gradient computation for k (k<<N) sampled constraints, that is $O(d^e\ dk)$. The outer loop for alternation converges within approximately 5-10 iterations depending on ϵ. 2) Test: Test time complexity is substantially the same as in large-margin embedding (LME), which is $O(d_e\ (C+d))$.

Figure 5:
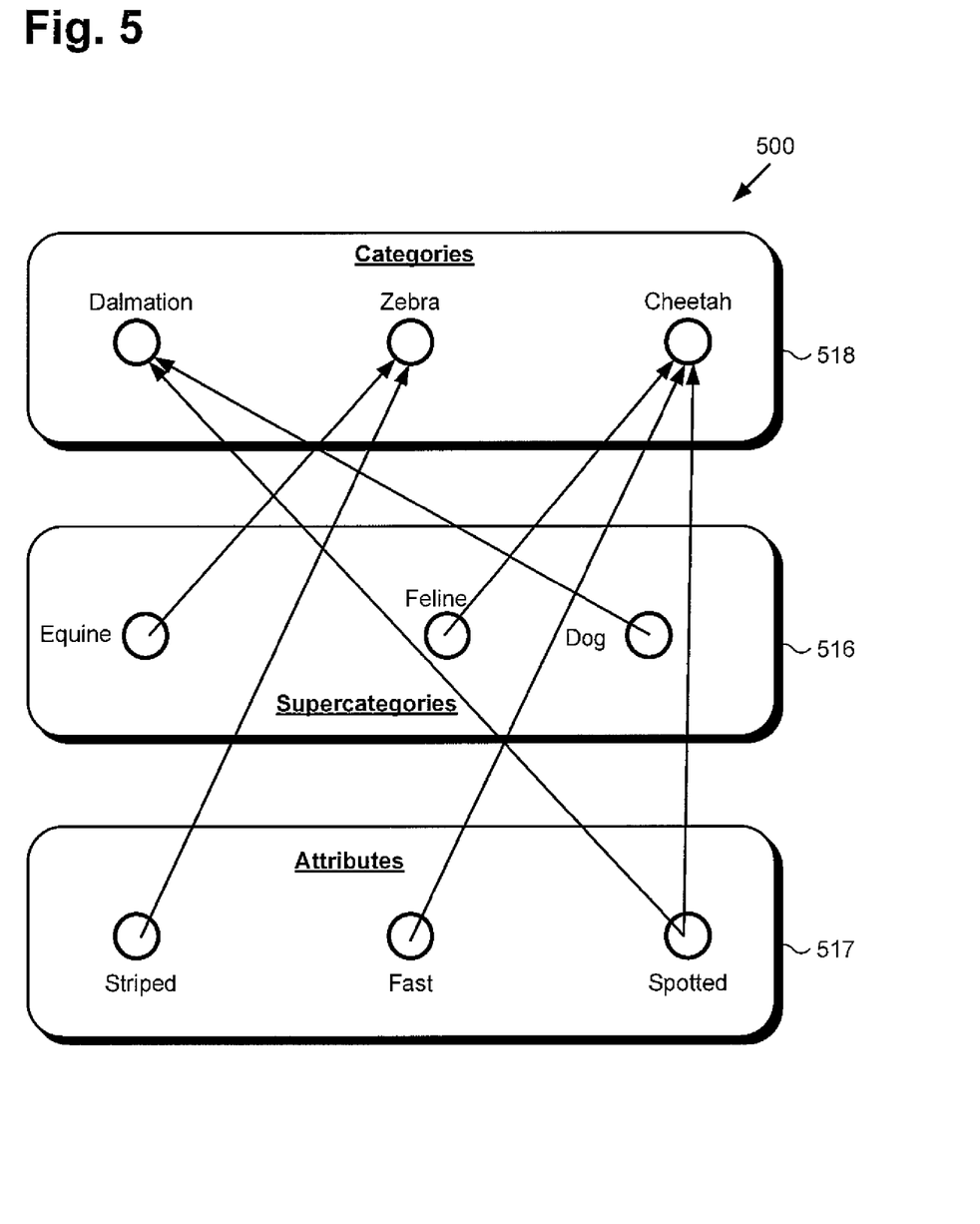
FIG. 5 shows an exemplary diagram illustrating association of an object with a category based on a supercategory to which the category belongs and one or more attributes of the object.

Referring once again to FIG. 4 with further reference to FIGS. 1, 2, and 3, in some implementations, flowchart 400 continues with providing a human readable output identifying the category associated with the object, e.g., object category 116/216 (action 450). For example, processor 104/204/234/334 may be configured to execute respective object categorizing unit 110/210a/210b/310 to provide a category corresponding to object category 116/216 as an output in the form of one or more words readable by user 140. As noted above, in some implementations, object category 116/216 is associated with object image 124 based on the supercategory to which object category 116/216 belongs and one or more attributes of the object identified in object image 124. FIG. 5 illustrates such an approach.

FIG. 5 shows exemplary diagram 500 depicting association of an object with its category 518 based on a supercategory 516 and one or more attributes 517. It is noted, that as shown by diagram 500, each of categories 518 can be represented as the sum of its supercategory plus its supercategory specific modifier(s) or attribute(s), i.e., supercategory+attribute(s). In addition, it is desirable that the representation of the object be compact. For example, instead of describing an object in the category "Dalmatian" as a domestic animal with a lean body, four legs, a long tail, and spots, it is more efficient to describe it is a spotted dog, as shown in FIG. 5. It is also more exact since the higher-level supercategory dog contains all general properties of different dog breeds, including indescribable dog-specific properties, such as the shape of the head, and its posture.

This approach exemplifies how a human, such as user 140, would describe an object, to efficiently communicate and understand the concept. Thus, an object categorized as zebra may be described as a striped equine, while an object categorized as a cheetah may be described as a fast, spotted, feline, as further shown in FIG. 5. Such decomposition of a category into supercategory+attribute(s) can hold for categories at any level. For example, although not shown in FIG. 5, supercategory feline could be described as a stalking carnivore, where carnivore is a supercategory of the supercategory feline, using this approach.

In some implementations, flowchart 400 may conclude with action 450 described above. However, in other implementations, flowchart 400 may continue with adaptively revising object representation map 112/212a/212b/312 used to classify the object corresponding to object image 124 (action 460). For example, processor 104/204/234/334 may be configured to execute respective object categorizing unit 110/210a/210b/310 to receive one or more inputs from user 140 characterizing object image 124 and/or object category 116/216. Based on that input or inputs, object categorizing unit 110/210a/210b/310 may be configured to update or otherwise adapt respective object representation map 112/212a/212b/312 to improve the accuracy with which object image 124 is classified.

Referring to FIG. 1, for example, system processor 104 may be configured to execute object categorizing unit 110 to interact with user 140 by issuing queries that can help to improve the object classification performance. The improvement can be attained by adapting object representation map 112 based on inputs received from user 140 in response to the queries. Because the number of categories can be large and the number of semantic relationships may be quadratic or even cubic in the number of categories, it would be impractical and inefficient to ask user 140 about all possible semantic relationships. Consequently, object categorizing unit 110 may be configured to examine object representation map 112 and to determine a ranked list of semantic relationships that are most important. This allows object categorizing unit 110 to work interactively with user 140 to improve classification performance as quickly as possible.

The approach may be threefold: 1) Object categorizing unit 110 actively generates semantic queries to be validated by user 140, by examining the results of the present classification model. 2) When generating the semantic query, object categorizing unit 110 identifies those that can best improve the discrimination performance when using object representation map 112. 3) Among the semantic queries generated by object categorizing unit 110, user 140 is asked to validate which of those presented is/are semantically plausible, and use that interactive user feedback to adapt object representation map 112. The classification performance of object categorizing unit 110 becomes increasingly accurate as this procedure is repeated.

As a specific example, to actively generate the semantic queries by examining the present state of object representation map 112, object categorizing unit 110 may be configured to utilize large-margin embedding (LME) for recognition, as noted above with reference to the exemplary process for performing actions 420, 430, and 440 of flowchart 400. The present solution for performing object classification learns a discrimination mapping for object classification by learning the data embedding matrix W for the input data $\{x_i\}$ and $\{u_j\}$ for each category j, such that each data instance $x_i$ projected by the learned data embedding is closer to its correct category prototype than to others. By examining the geometric configuration of category prototypes $u_j$ in the learned semantic mapping, proposals for semantic queries can be generated.

Once the set of plausible relative distances between the categories is generated as a list, the list can be ranked by predicted importance that captures how much a given relationship, if true, would improve recognition. To that end, a scoring function based on the conditional entropy may be used, which selects a confusing category as category "a", and rarely confused categories for categories "b" and "c." The approach is to rectify the mapping for category "a" with the help of more reliable categories for "b" and "c." This step adds value because it is desirable to substantially minimize the degree of human interaction required for generation or adaptive revision of object representation map 112. After scoring the constraints, the highest scoring queries may be presented to user 140, and the semantic constraints validated by user 140 may be incorporated into the object representation mapping as a form of regularization. As this process continues, the mapping becomes more accurate, and the queries typically become more difficult and fine grained.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An object classification system comprising:
a system processor;
a system memory; and
an object categorizing unit stored in the system memory;
wherein the system processor is configured to execute the object categorizing unit to:
receive image data corresponding to an object;
transform the image data into a directed quantity expressed at least in part in terms of semantic parameters;
determine a projection of the directed quantity onto an object representation map including a plurality of object categories;
associate the object with a category from among the plurality of object categories based on the projection; and
issue at least one query to a user for adapting the object representation map based on a ranked list of semantic relationships of the plurality of object categories.

2. The object classification system of claim wherein the system processor is configured to execute the object categorizing unit to associate the object with the category based on a proximity of the projection to the category on the object representation map.

3. The object classification system of claim 1, wherein the system processor is configured to execute the object categorizing unit to associate the object with the category based on a semantic supercategory to which the category belongs and at least one semantic attribute of the object.

4. The object classification system of claim 1, wherein the system processor is configured to execute the object categorizing unit to provide a human readable output identifying the category.

5. The object classification system of claim 4, wherein the human readable output comprises at least one word.

6. The object classification system of claim 1, wherein the object representation map is expressed in terms of components including at least one of object class semantic similarity, object class ontology, and object attributable properties.

7. The object classification system of claim 1, wherein the system processor is configured to execute the object categorizing unit to receive an input from the user in response to the query, the input characterizing at least one of the object and the category.

8. The object classification system of claim 7, wherein the system processor is configured to execute the object categorizing unit to adaptively revise the object representation map based on the input from the user.

9. A method for use by a object classification system including a system processor and an object categorizing unit stored in a system memory, the method comprising:
receiving image data corresponding to an object;
transforming the image data into a directed quantity expressed at least in part in terms of semantic parameters;
determining a projection of the directed quantity onto an object representation map including a plurality of object categories;
associating the object with a category from among the plurality of object categories based on the projection; and
issue at least one query to a user for adapting the object representation map based on a ranked list of semantic relationships of the plurality of object categories.

10. The method of claim 9, wherein associating the object with the category is performed based on a proximity of the projection to the category on the object representation map.

11. The method of claim 9, wherein associating the object with the category is performed based on a semantic supercategory to which the category belongs and at least one semantic attribute of the object.

12. The method of claim 9, further comprising providing a human readable output identifying the category.

13. The method of claim 12, wherein the human readable output comprises at least one word.

14. The method of claim 9, wherein the object representation map is expressed in terms of components including at least one of object class semantic similarity, object class ontology, and object attributable properties.

15. The method of claim 9, further comprising receiving an input from the user in response to the query, the input characterizing at least one of the object and the category.

16. The method of claim 15, further comprising adaptively revising the object representation map based on the input from the user.

17. A computer-readable non-transitory medium having stored thereon instructions, which when executed by a system processor, instantiate a method comprising:
receiving image data corresponding to an object;
transforming the image data into a directed quantity expressed at least in part in terms of semantic parameters;
determining a projection of the directed quantity onto an object representation map including a plurality of object categories;
associating the object with a category from among the plurality of object categories based on the projection; and
issuing at least one query to a user for adapting the object representation map based on a ranked list of semantic relationships of the plurality of object categories.

18. The computer-readable non-transitory medium of claim 17, further comprising providing a human readable output identifying the category.

19. The computer-readable non-transitory medium of claim 17, further comprising receiving an input from the user in response to the query, the input characterizing at least one of the object and the category.

20. The computer-readable non-transitory medium of claim 19, further comprising adaptively revising the object representation map based on the input from the user.

* * * * *

UNITED STATES PATENT AND TRADEMARK OFFICE
CERTIFICATE OF CORRECTION

PATENT NO. : 9,740,964 B2
APPLICATION NO. : 14/675268
DATED : August 22, 2017
INVENTOR(S) : Hwang et al.

It is certified that error appears in the above-identified patent and that said Letters Patent is hereby corrected as shown below:

In the Claims

Column 11, Line 21, Claim 2 "claim wherein" should be changed to --claim 1 wherein--

Signed and Sealed this
First Day of May, 2018

Andrei Iancu
*Director of the United States Patent and Trademark Office*